United States Patent [19] [11] 4,403,079
Uhrig et al. [45] Sep. 6, 1983

[54] ANIONIC SURFACE-ACTIVE COMPOUNDS BASED ON OXYALKYLATED NAPHTHOL NOVOLACS AND THEIR USE

[75] Inventors: Heinz Uhrig, Steinbach; Klaus Ehl, Frankfurt am Main, both of Fed. Rep. of Germany

[73] Assignee: Hoechst Aktiengesellschaft, Frankfurt am Main, Fed. Rep. of Germany

[21] Appl. No.: 347,485

[22] Filed: Feb. 10, 1982

[30] Foreign Application Priority Data

Feb. 12, 1981 [DE] Fed. Rep. of Germany ....... 3104991

[51] Int. Cl.$^3$ ........................ C08F 283/00; C08G 8/28
[52] U.S. Cl. .................................... 525/507; 252/8.7; 252/353; 525/502; 525/505
[58] Field of Search ..................... 525/507, 502, 505; 528/129

[56] References Cited

U.S. PATENT DOCUMENTS

| | | | |
|---|---|---|---|
| 2,581,392 | 1/1952 | De Groote et al. | 525/507 X |
| 2,766,213 | 10/1956 | Dickson | 525/507 X |
| 3,244,770 | 4/1966 | Kirkpatrick et al. | 525/507 X |
| 3,888,828 | 6/1975 | Grossmann et al. | 525/507 X |
| 4,032,514 | 6/1977 | Buriks et al. | 525/507 |

*Primary Examiner*—Lucille M. Phynes
*Attorney, Agent, or Firm*—Curtis, Morris & Safford

[57] ABSTRACT

Condensation products, which can be obtained by a reaction of naphthols and alkanals, addition of alkylene oxides and more or less complete conversion of terminal hydroxy groups into sulfo groups or half-esters of maleic acid, phthalic acid or sulfosuccinic acid, are suitable for use as surface-active agents, in particular as coupling auxiliaries in the preparation of azo pigments and also as dispersing agents in the preparation of colorant dispersions and as wetting, emulsifying, leveling or dyeing auxiliaries.

10 Claims, No Drawings

ANIONIC SURFACE-ACTIVE COMPOUNDS BASED ON OXYALKYLATED NAPHTHOL NOVOLACS AND THEIR USE

The invention relates to compounds of the general formula I

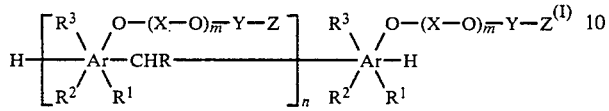

in which Ar denotes naphthalene, X denotes —CH$_2$—CH$_2$— and/or —CH$_2$—CH(CH$_3$)—, Y denotes identical or different radicals of the formulae —CH$_2$—CH$_2$—, —CH$_2$—CH(CH$_3$)— and —CH$_2$—CHOH—CH$_2$—, Z denotes identical or different radicals of the formulae —OH, —O—CO—CH=CH—COOM, —O—CO—CH$_2$—CH(SO$_3$M)—COOM,

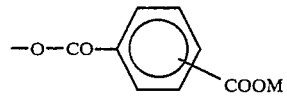

and —SO$_3$M, in which M represents a cation, with the proviso that at least one radical Z is different from OH, R$^1$, R$^2$ and R$^3$ denote hydrogen or alkyl having 1 to 14 C atoms, R denotes hydrogen or alkyl having 1 to 9 C atoms, m denotes a number from 1 to 150 and n denotes a number from 1 to 9.

Those compounds of the formula I are preferred in which X denotes —CH$_2$—CH$_2$—, Y denotes —CH$_2$—CH$_2$— or —CH$_2$—CHOH—CH$_2$—, Z denotes —O—CO—CH$_2$—CH(SO$_3$M)—COOM,

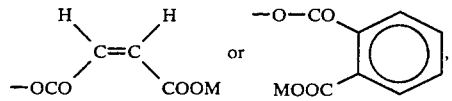

R$^1$ denotes hydrogen or alkyl having 1 to 12 C atoms, R$^2$ and R$^3$ denote hydrogen, R denotes hydrogen or alkyl having 1 to 4 C atoms, m denotes a number from 2 to 25, n denotes a number from 2 to 6 and M denotes hydrogen, an alkali metal, one equivalent of an alkaline earth metal, or an ammonium group which can be substituted by lower alkyl, or an ammonium group obtained from ammonia or such lower alkylamines by addition of up to 100 ethylene oxide and/or propylene oxide units.

Those compounds of the formula I are particularly preferred in which Z denotes —O—CO—CH$_2$—CH(SO$_3$Na)—COONa, R$^1$ denotes methyl or alkyl having 6 to 12 C atoms, R denotes hydrogen and m denotes a number from 8 to 20.

The invention also relates to the use of compounds of the formula I as surface-active agents, in particular as coupling auxiliaries in the preparation of azo pigments and also as dispersing agents in the preparation of colorant dispersions, preferably of disperse dyestuffs and of pigments, and further as wetting, emulsifying, leveling or dyeing auxiliaries.

In the text below the preparation of compounds of the formula I will be explained, radicals and indices having the abovementioned meanings:

Condensation of (n+1) moles of one or more naphthols of the formula II

with n moles of one or more alkanals of the formula III $$R—CHO \quad (III)$$

produces condensation products which correspond essentially to the formula IV

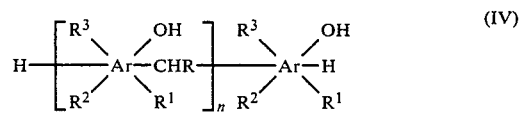

These condensation products are referred to in the text below as "novolacs", which are mixtures of condensation products even when only one naphthol and only one aldehyde is used, ie. n in the formula IV corresponds only in the main product to the number of moles used of an alkanal of the formula III, and condensation products having lower and higher values for n are present as by-products.

Novolacs of the formula IV are reacted with ethylene oxide and/or propylene oxide, in which reaction compounds of the formula I are obtained in which Y has the meaning of X and Z denotes OH. Compounds according to the invention can contain such compounds in a minor amount.

There are several possible processes for introducing the anionic function Z:

Terminal hydroxy groups on the oxyalkylate chains can be converted more or less completely into the corresponding half-esters by acylating them with 1,2-ethylenedicarboxylic acids or benzenedicarboxylic acids or with the corresponding acylating derivatives, for example with the anhydrides. Phthalic anhydride and in particular maleic anhydride are preferred acylating agents.

On acylation with 1,2-ethylenedicarboxylic acids or with derivatives thereof, in particular with maleic anhydride, the resulting products can be used as starting materials in the preparation of the corresponding sulfosuccinates by adding sulfites to these products.

There are likewise several ways of introducing the sulfo group:

Terminal hydroxy groups of the oxyalkylate chains can be converted completely or partially into more reactive substituents, for example into halogen atoms by treatment with corresponding halogenation agents, such as thionyl chloride. It is also possible to react the oxyalkylates with epichlorohydrin, in which reaction intermediate products for the preparation of compounds of the formula I are obtained in which Y has the meaning —CH$_2$—CHOH—CH$_2$—.

These reactive intermediate products can then be reacted with a sulfite to give the corresponding sulfo compounds.

In the text below particularly preferred embodiments of the invention are explained in greater detail, and percentage data refer to weight unless otherwise indicated.

Preferred starting materials for the formation of novolacs are, in addition to α- and β-naphthol, alkylnaphthols based on β-naphthol, such as, for example, methylnaphthol, butylnaphthol, octylnaphthol, nonylnaphthol, decylnaphthol, dodecylnaphthol, tetradecylnaphthol, dibutylnaphthol, dioctylnaphthol, dinonylnaphthol, didecylnaphthol, didodecylnaphthol, ditetradecylnaphthol or tributylnaphthol and mixtures thereof, it being possible for the alkyl radicals to be straight-chain or branched. Monoalkylnaphthols are preferred.

The following examples of alkanals can be listed: formaldehyde, acetaldehyde, propionaldehyde and butyraldehyde, and those compounds which form such alkanals, such as paraformaldehyde, trioxane, tetraoxamethylene and paraldehyde.

In the preparation of novolacs, monoalkylnaphthols are preferably condensed with formaldehyde in a molar ratio of 2:1 to 10:9, above all 3:2 to 7:6, by processes which are in themselves known (for example Hultzsch, "Chemie der Phenolharze [The Chemistry of Phenolic Resins]" (1950), page 114) in the presence of acid catalysts. In the reaction, formaldehyde can be used in the form of an aqueous solution or as paraformaldehyde, and it is possible to use an excess of 5–10 mole percent. Acids which can be used as acid catalysts are mineral acids, such as sulfuric acid or phosphoric acid, or sulfonic acids, such as dodecylbenzenesulfonic acid, or, preferably, hydrochloric acid because it can be readily removed when distilling off the water. The acids are generally used in a concentration of 0.1 to 5%, relative to alkylnaphthol. Reaction water formed after a reaction time of 3 to 20 hours is distilled off to such an extent that the water content in the novolac resin is less than 0.5%. The final stages of this distillation are carried out under a reduced pressure of less than about 65 mbars.

The novolacs obtained are clear resins which are colored light brown to dark brown and the consistency of which varies from more or less viscous to waxy or brittle. Their composition depends above all on the ratio of alkylnaphthol to formaldehyde and they have an average molecular weight of between 500 and 6,000.

The oxyalkylation of the novolacs is carried out by known methods, preferably with alkali metal hydroxides or alkali metal alkoxides as a catalyst at 100° to 200° C., preferably at 140° to 180° C. A quantity of ethylene oxide and/or propylene oxide is so chosen that a stable emulsion or a complete solubility of the novolac oxyalkylates in water is achieved, ie. the amount of alkylene oxide added depends on the degree of hydrophilicity desired. It is preferred that 1 to 150, preferably 2 to 25, in particular 8 to 20, moles of ethylene oxide and/or propylene oxide are added to each hydroxy group of the novolac resins. If ethylene oxide and propylene oxide are both used, they can be used separately, that is batchwise, or as a mixture. Potassium hydroxide or, preferably, sodium hydroxide are suitable for use as alkali metal hydroxide and sodium methylate or sodium ethylate are suitable for use as alkali metal alkoxide; the concentration is preferably 0.05 to 1.0%, relative to the novolac. The oxyalkylation can be carried out unpressurized or in pressure vessels, to which the alkylene oxide can be added in a gaseous or liquid form. The operating pressure is 1 to 10, preferably 2 to 4, bars.

Representatives which may be mentioned of the dicarboxylic acids or the corresponding anhydrides used for acylating the oxyalkylates are maleic acid, fumaric acid, maleic anhydride, phthalic acid, terephthalic acid and phthalic anhydride. The reaction of the novolacs with maleic anhydride or phthalic anhydride to give maleic acid half-esters or phthalic acid half-esters respectively is carried out by mixing the components and stirring at 20° to 100° C., preferably 40° to 80° C., in the presence of alkali metal hydroxides, the concentration of which is 0.1 to 1.0%, relative to the total mixture. Since maleic anhydride tends to sublime it is advantageous to carry out the reaction in pressure vessels under an overpressure of 0.2–1.0 bar of nitrogen or air and to provide vigorous mixing since the molten maleic anhydride does not readily mix with the oxyalkylates at the beginning of the reaction. The quantity of maleic anhydride or of phthalic anhydride is preferably so chosen that all oxyalkylate hydroxy terminal groups are reacted.

The conversion of maleic acid half-ester compounds into the corresponding sulfosuccinic acid half-esters is effected by the addition of aqueous solutions of sulfites or hydrogen sulfites. 1.0 to 1.5, preferably 1.0–1.1, moles of sulfurous acid in the form of the sulfites, hydrogen sulfites or pyrosulfites of alkali metals or of alkaline earth metals are used per maleic acid half-ester group.

Whilst the sulfites are particularly suitable for formation of dialkali metal salts of sulfosuccinic acid half-esters, it is impossible in the addition of hydrogen sulfites to exert an additional influence on the degree of hydrophilicity by neutralizing with bases, such as ammonia, low-molecular alkylamines or alkylolamines or alkylene oxide adducts thereof, in which 1 to 100, preferably 5 to 30, moles of propylene oxide and/or, preferably, ethylene oxide are added to 1 mole of ammonia or amine. Those radicals are referred to as "low"-molecular which contain up to 4 C atoms. Representatives which may be mentioned of low-molecular alkylamines or alkylolamines are ethylamine, n-propylamine, iso-propylamine, n-butylamine, iso-butylamine, monoethanolamine, mono-n-propanolamine, mono-iso-propanolamine, mono-n-butanolamine, mono-iso-butanolamine, di-ethanolamine, di-n-propanolamine, di-n-butanolamine, triethanolamine, tripropanolamine or tributanolamine and diamines and polyamines, such as ethylenediamine, diethylenetriamine, triethylenetetraamine, propylenediamine, dipropylenetriamine or tripropylenetetraamine. The amount of water added can be 50 to 85%, relative to the total solution or mixture, and is dependent on the solubility of the sulfosuccinic acid half-ester salts and on the viscosity of the solutions. The reaction temperatures are 20° to 100° C., preferably 40° to 80° C.

For the preparation of products containing sulfo groups, reactive groups, preferably chlorine atoms, are introduced into the molecule at the end of the ethylene oxide and/or ethylene oxide/propylene oxide chain(s), for example by addition of epichlorohydrin to the terminal hydroxy group(s) at temperatures between 20° and 100° C., preferably between 40° and 90° C., in the presence of catalysts, such as tin tetrachloride, or by direct halogenation by means of halogenating agents, such as thionyl chloride, at temperatures between 40° and 100° C., the terminal OH group(s) being replaced completely or partially by chlorine atoms. The chlorine-containing intermediate products thus obtained are reacted with sodium sulfite in a pressure vessel at temperatures between 100° and 200° C., preferably at 140° to 180° C.

For the purpose of preparing polyadducts it is known to condense oxyethylated naphthols or chloronaphthols with various aldehydes (German Patent Specification No. 1,222,258). The polyadducts are dispersing agents and are suitable for the preparation of aqueous pastes of pigments and dyestuffs.

It is known from German Offenlegungsschrift No. 2,759,203, to incorporate novolacs, the hydroxy groups of which can be etherified, into surfactant-containing pigment dispersions.

German Patent Specifications Nos. 2,132,403 and 2,132,404 disclose the use of analogous novolac sulfosuccinic acid half-esters derived from alkylphenols for dispersing dyestuffs and pigments. Compared with these products the compounds according to the invention have advantages when used as coupling auxiliaries.

In water the compounds according to the invention and mixtures thereof produce systems ranging from emulsions to clear solutions, which have only a low foam-forming tendency, measured by the Ross-Miles test (DIN 53,902), and, at the same time, lower the surface tension, measured by the ring detachment method (DIN 53,914), to the optimum value of $45 \cdot 10^{-3}$ N/m. At the same time they wet cotton fabric in the immersion wetting method (DIN 53,901), in the course of seconds at 70° C. and they are stable in the alkaline and acid application ranges which are customary for surfactants.

The substances according to the invention can be used for a wide variety of purposes owing to their versatile surface-active properties. This is true above all concerning the use as coupling auxiliaries in the preparation of azo colorants, in particular of azo pigments, and also as dispersing agents and distributing agents for finely dividing and stabilizing sparingly soluble and insoluble colorants, preferably disperse dyestuffs, which are preferably used in the form of dyestuff dispersions for dyeing natural and synthetic fiber material, such as cotton, wool, cellulose, viscose rayon staple, cellulose acetate, cellulose triacetate, polyester, polyamide and polyacrylonitrile, or fiber materials containing these materials. The substances according to the invention are moreover very highly suitable for the preparation of aqueous pigment dispersions having good flow, for the formulation of plant protection agents and pesticides and also as leveling and dyeing auxiliaries. In these uses the substances according to the invention can all be applied on their own, as mixtures or in combinations with other non-ionic and/or anionic surfactant compounds, builders and other additives or auxiliaries.

The examples below serve to explain the invention in greater detail. Parts and percentage data are parts and percentage data by weight, and pressure data are in terms of "overpressure", unless otherwise stated.

EXAMPLES

Examples A–I describe the preparation of compounds according to the invention.

COMPOUND A (a) Preparation of a Pentanuclear (Methyl-β-naphthol)-novolac 200 parts of methyl-β-naphthol were melted at an internal temperature of 60° C., and 33.8 parts of paraformaldehyde were added to it with slow stirring. Stirring was carried out for 30 minutes at 60° C. under a blanket of nitrogen, and after the internal temperature had been increased to 90° C., 2.5 parts of concentrated hydrochloric acid were added dropwise. Thereafter stirring was carried out for 16 hours at 110° C. while nitrogen was being passed through at the same time. After a further increase of the internal temperature to 135° to 140° C. the reaction water was removed in the course of 2 hours. The pressure was then reduced to about 20 to 30 mbars and stirring was continued for 1 hour at 135° to 140° C. A red-brown, clear, brittle resin was obtained after cooling.

(b) Preparation of a Novolac Oxyalkylate 200 parts of a novolac obtained according to (a) were oxyethylated while stirring and passing in 206 parts of ethylene oxide in a pressure vessel after the addition of 1.1 parts of freshly pulverized sodium hydroxide at an internal temperature of 150° to 160° C. under a pressure which was maintained at 2 to 4 bars. After the total amount of ethylene oxide had been injected, stirring was continued for 1 hour at 150° to 160° C. The resulting viscous oxyethylate contained 50 moles of ethylene oxide.

(c) Preparation of a Sulfosuccinic Acid Half-Ester 300 parts of an oxyethylate obtained according to (b) were esterified in the course of 3 hours at 70° to 80° C. under a blanket of nitrogen after the addition of 105.6 to 116.2 parts of maleic anhydride and 0.3 part of sodium hydroxide. After diluting with water, an aqueous solution of 135.8 to 149.4 parts of sodium sulfite were then added with stirring at 40° to 80° C. in the course of 15 to 120 minutes. As soon as the batch became clear stirring was continued for 1 more hour. The amount of water added could be between 50 and 85% of the final solution.

COMPOUND B (a) Preparation of a Pentanuclear (Methyl-β-naphthol)-novolac 54.3 parts of butyraldehyde were added in accordance with Example A(a) to 150 parts of methyl-β-naphthol and a condensation reaction was carried out for 15 hours at an internal temperature of 110° C. after the addition of 3 parts of concentrated hydrochloric acid.

(b) Preparation of a novolac oxyethylate 160 parts of a novolac obtained according to (a) were reacted in a manner corresponding to that for compound A(b) with 650 parts of ethylene oxide after the addition of 1.5 parts of sodium methylate in a pressure vessel at an internal temperature of 150° to 160° C. The resulting viscous oxyethylate contained 80 moles of ethylene oxide.

(c) Preparation of a sulfosuccinic acid half-ester 200 parts of an oxyethylate obtained according to (b) were reacted in a manner corresponding to that for compound A(c) with 21.6 to 23.76 parts of maleic anhydride and 27.8 to 30.6 parts of sodium sulfite with the addition of water. The amount of water added could be between 50 and 85% of the final solution.

COMPOUND C

(a) Preparation of a trinuclear (nonyl-β-naphthol)novolac 810 parts of nonyl-β-naphthol were initially introduced and 166 parts of paraformaldehyde were added to it at room temperature with slow stirring. Stirring was carried out for 1 hour at 50° C. under a blanket of nitrogen, and after the internal temperature had been increased to 90° C., 9.0 parts of concentrated hydrochloric acid were added dropwise. Thereafter stirring was carried out for 6 hours at 110° C. while at the same time nitrogen was being passed through, and after a further increase of the internal temperature to 135° to 140° C., the reaction water was removed in the course of 4 hours. The pressure was then reduced to about 20 to 30 mbars, and stirring was continued for 2 hours at 135° to 140° C. A dark red-brown clear solid resin was obtained after cooling down.

(b) Preparation of a novolac oxyethylate 200 parts of a novolac obtained according to (a) were oxyethylated with stirring and passing in of 603 parts of ethylene oxide in a pressure vessel after the addition of 1.1 parts of freshly pulverized sodium hydroxide at 160° to 170° C. under a pressure which was maintained at 2 to 4 bars. After the total amount of ethylene oxide had been injected, stirring was continued for 1 hour at 160° to 170° C. The resulting viscous oxyethylate contained 60 moles of ethylene oxide.

(c) Preparation of a sulfosuccinic acid half-ester 300 parts of an oxyethylate obtained according to (b) were esterified after the addition of 25.2 to 27.7 parts of maleic anhydride and of 0.3 part of sodium hydroxide in the course of 3 hours at 70° to 80° C. under a blanket of nitrogen. After diluting with water, 32.2 to 35.4 parts of sodium sulfite were then added with stirring in the form of an aqueous solution in the course of 15 to 120 minutes at 40° to 80° C. After the batch had formed a clear aqueous solution, stirring was continued for 1 more hour. The amount of water added could be between 50 and 85% of the final solution.

COMPOUND D

(a) Preparation of a pentanuclear (nonyl-β-naphthol)novolac 1350 parts of nonyl-β-naphthol were initially introduced and 132 parts of paraformaldehyde were added to it at room temperature with slow stirring. Stirring was carried out for 1 hour at 50° C. under a blanket of nitrogen, and, after the internal temperature had been increased to 90° C., 15.1 parts of concentrated hydrochloric acid were added dropwise. Thereafter stirring was carried out for 10 hours at 110° C. while at the same time nitrogen was being passed through, and after the increase of the internal temperature to 135° to 140° C. the reaction water was removed in the course of 4 hours. The pressure was then reduced to about 20 to 30 mbars and stirring was continued for 2 hours at 135° to 140° C. A dark red-brown solid resin was obtained after cooling down.

(b) Preparation of a novolac oxyethylate 200 parts of a novolac obtained according to (a) were oxyethylated after the addition of 1.1 g of freshly pulverized sodium hydroxide in a pressure vessel with stirring and passing in of 572 parts of ethylene oxide at 160° to 170° C. under a pressure which was maintained at 2 to 4 bars. When the total amount of ethylene oxide had been injected, stirring was continued for 1 hour at 160° to 170° C. The resulting viscous oxyethylate contained 95 moles of ethylene oxide.

(c) Preparation of a maleic acid half-ester 500 parts of an oxyethylate obtained according to (b) were stirred for 3 hours at 70° to 80° C. under a blanket of nitrogen after the addition of 43.8 to 48.2 parts of maleic anhydride and of 0.5 part of sodium hydroxide, and the mixture was then diluted with water and neutralized with sodium hydroxide solution. The amount of water added could be between 50 and 80% of the final solution.

COMPOUND E

Preparation of a phthalic acid half-ester 500 parts of an oxyethylate D(b) were stirred for 4 hours at 70° to 80° C. under a blanket of nitrogen after the addition of 66.2 to 72.8 parts of phthalic anhydride and of 0.56 part of sodium hydroxide, and the mixture was then diluted with water and neutralized with sodium hydroxide solution. The amount of water added could be between 50 and 80% of the final solution.

COMPOUND F

Preparation of a phthalic acid sulfosuccinic acid half-ester 500 parts of an oxyethylate D(b) were stirred for 4 hours at 70° to 80° C. under a blanket of nitrogen after the addition of 26.4 to 29.1 parts of phthalic anhydride, 26.3 to 28.9 parts of maleic anhydride and 0.5 part of sodium hydroxide. The mixture was then diluted with water and 33.8 to 37.2 parts of sodium sulfite were then added to it in portions at 40° to 80° C. until the batch had become a clear solution. Stirring was then continued for 1 hour and the solution was then neutralized with sodium hydroxide solution. The amount of water added could be between 50 and 85% of the final solution.

COMPOUND G

Preparation of a sulfosuccinic acid half-ester 500 parts of an oxyethylate D(b) were esterified analogously to the compound A(c) after the addition of 43.8 to 48.2 parts of maleic anhydride and of 0.5 part of sodium hydroxide; after diluting with water, 56.4 to 62.0 parts of sodium sulfite (in the form of an aqueous solution) were then added with stirring at 40° to 80° C. in the course of 15 to 120 minutes until the batch had become a clear solution. Stirring was then continued for 1 hour. The amount of water added could be between 50 and 85% of the final solution.

COMPOUND H

Preparation of a sodium sulfonate 25 parts of tin tetrachloride were added to 500 parts of an oxyethylate D(b) after it had been warmed to 90° C. 41.4 parts of epichlorohydrin were then added dropwise in the course of 30 to 40 minutes. Stirring was continued for 2 hours at 80° C. After the catalyst had been removed, the crude product was reacted with 56.4 parts of sodium sulfite in an autoclave in the course of 4 hours at 160° C. and under 4 to 6 bars. After working up

COMPOUND I

(a) Preparation of a heptanuclear (nonyl-β-naphthol)novolac 800 parts of nonly-β-naphthol were initially introduced, and 84 parts of paraformaldehyde were added to it at room temperature with slow stirring. Stirring was carried out for 1 hour at 50° C. under a blanket of nitrogen, and after the internal temperature had been increased to 90° C., 9.3 parts of concentrated hydrochloric acid were added dropwise. A condensation reaction was then carried out in accordance with the manner employed for compound B(a) for 15 hours at 110° C. while nitrogen was being passed through, and stirring was continued for a further 4 hours at an internal temperature of 135° to 140° C., during which period the reaction water was being removed. Stirring was then continued for a further 2 hours at 135° to 140° C. A dark red-brown clear brittle resin was obtained after cooling down.

(b) Preparation of a novolac oxyethylate 200 parts of a novolac obtained according to (a) were reacted with 625 parts of ethylene oxide in a manner corresponding to that for compound B(b) after the addition of 1.1 parts of freshly pulverized sodium hydroxide. The resulting viscous alkylene oxide adduct contained 140 moles of ethylene oxide.

(c) Preparation of a sulfosuccinic acid half-ester 500 parts of an oxyethylate obtained according to (b) were reacted in a manner corresponding to that for compound G with 41.6 to 45.8 parts of maleic anhydride at 70° to 80° C. and with 53.4 to 58.9 parts of sodium sulfite (in the form of an aqueous solution). The amount of water added could be between 50 and 85% of the final solution.

TEST EXAMPLES

The test method described hereinafter was used for testing the dispersing properties of substances according to the invention for finely dividing and stabilizing disperse dyestuffs:

For carrying out comparative grinding experiments, corresponding to German Offenlegungsschrift No. 2,132,403, about 10 g of the dyestuff C.I. Disperse Red 65 are ground with the compound under test, water and 50 g of Sili-Quarzit beads (diameter of 1 mm), by means of a 2-disk stirrer similar to customary stirrers in stirred ball mills, in a small cylinder equipped with a laboratory stirring motor while cooling. The progress of the fine dividing is monitored by means of a microscopic examination of filter paper spot tests taken at regular intervals and assessed on a 5 point scale (1 denotes very poor and 5 denotes very good). The shelf life can be assessed by diluting samples to a dyestuff concentration desired, storing the samples at 50° C. in a drying cabinet and repeating the spot tests after, for example, 1, 3 and 6 weeks' storage, and the time period indicated below refers to a time when the stability is still good.

For determining the dyeing behavior at 106° C., a polyester/wool blend, and for the dyeing behavior at 130° C., polyester were dyed by known processes. In the table below the result is defined by the numbers 1 to 5.

1 denotes no dyeing behavior
2 denotes slight
3 denotes utilizable
4 denotes good
5 denotes very good

TABLE

| Compound | Grinding time (h) | Quality of the dispersion | Stability (weeks) | Dyeing at 106° C. | Dyeing at 130° C. |
|---|---|---|---|---|---|
| A | 3 | 5 | 5 | 5 | 5 |
| B | 3 | 5 | 5 | 5 | 5 |
| C | 4 | 4–5 | 4–5 | 5 | 5 |
| D | 4 | 5 | 4–5 | 5 | 5 |
| E | 3 | 5 | 5 | 5 | 5 |
| F | 6 | 4–5 | 4–5 | 5 | 5 |
| G | 3 | 5 | 4–5 | 5 | 5 |
| I | 3 | 5 | 5 | 5 | 5 |

The use of substances according to the invention as coupling auxiliaries for azo pigments is illustrated in the examples below without being limited to them.

EXAMPLE 1

11 parts of dinitroaniline were diazotized in a known manner in a mixture of sulfuric acid and hydrochloric acid by means of 10.4 parts of a 40% strength sodium nitrite solution. A precipitate was formed when a solution of 8.64 parts of β-naphthol in a mixture of 100 parts of water and 8 parts of 33% strength sodium hydroxide solution was added dropwise to a mixture of 300 parts of water and 10 parts of 31% strength hydrochloric acid. A coupling reaction to give C.I. Pigment Orange 5 was then carried out in a known manner by adding the clarified diazonium salt solution to the suspension of the precipitated β-naphthol. The pigment was then filtered, washed with water and finally dried.

The quality of the pigment can be influenced by adding surface-active agents to the solution of the β-naphthol and/or to the initially introduced hydrochloric acid when precipitating of the coupling component.

EXAMPLE 1a

Pigment Orange 5 was made by following the coupling procedure described in Example 1, but prior to the dropwise addition of the β-naphthol solution 1 part of compound G was added to the initially introduced mixture of 300 parts of water and 10 parts of 31% strength hydrochloric acid. The pigment thus produced was distinguished from that described in Example 1 by a markedly more yellow shade and a considerably higher intensity not only in letterpress and offset printing but also in aqueous formulations for flexographic printing or emulsion paints. The printing inks and formulations were distinguished by their low viscosity. Moreover, the pigment thus obtained had a more pronounced gloss and better transparency in letterpress and offset printing.

EXAMPLE 2

34.5 parts of 4-chloro-2-nitroaniline were stirred in dilute hydrochloric acid, a diazotization reaction was then carried out in a known manner by means of 34.7 parts of a 40% strength sodium nitrite solution and the mixture was then clarified 43.25 parts of acetoacet-2-chloroanilide were stirred into a mixture of 800 parts of water, 4 parts of glacial acetic acid and 8.1 parts of 33% strength sodium hydroxide solution. The coupling to give C.I. Pigment Yellow 3 was then carried out at 10° to 20° C. by feeding in the diazonium salt solution below the surface of the coupling component suspension. The pH value of the coupling broth was maintained during this addition at 4 to 4.5 by the addition of dilute sodium hydroxide solution. The pigment was then filtered off, washed with water and finally dried.

The quality of the pigment can be influenced by the addition of surface-active agents to the suspension of the coupling component.

EXAMPLE 2a

Pigment Yellow 3 was prepared by a coupling reaction as described in Example 2, but 4 parts of compound G were added to the suspension of the acetoacet-2-chloroanilide.

The pigment thus obtained had, in a long-oil alkyd resin lacquer, a considerably higher intensity, a high transparency and a more greenish and purer hue than the Pigment Yellow 3 prepared according to Example 2.

EXAMPLE 3

30.4 parts of 3-nitro-4-aminotoluene were diazotized in a known manner in dilute hydrochloric acid by means of 35 parts of a 40% strength sodium nitrite solution and the mixture was then clarified. 36 parts of acetoacetanilide were stirred into a mixture of 600 parts of water, 4 parts of glacial acetic acid and 8.1 parts of 33% strength sodium hydroxide solution.

The coupling reaction to give C.I. Pigment Yellow 1 was then carried out at 10° to 20° C. by feeding in the diazonium salt solution underneath the surface of the coupling component suspension. The pH value of the coupling broth was maintained during this addition at 4.5 by the addition of dilute sodium hydroxide solution. The pigment was then filtered off, washed with water and finally dried.

The quality of the pigment can be influenced by the addition of surface-active agents to the suspension of the acetoacetanilide.

EXAMPLE 3a

A coupling reaction to give Pigment Yellow 1 was carried out as described in Example 3, but 3.5 parts of compound G were added to the acetoacetanilide suspension before the start of the coupling reaction. The pigment thus obtained had, in a long-oil alkyd resin lacquer, a markedly higher transparency than the Pigment Yellow 1 prepared according to Example 3.

We claim:

1. A compound of the formula I $$\left[ H \begin{array}{c} R^3 \\ | \\ Ar-CHR \\ | \\ R^2 \end{array} \begin{array}{c} O-(X-O)_{\overline{m}}-Y-Z \\ | \\ R^1 \end{array} \right]_n \begin{array}{c} R^3 \\ | \\ Ar-H \\ | \\ R^2 \end{array} \begin{array}{c} O-(X-O)_{\overline{m}}-Y-Z \\ | \\ R^1 \end{array} \quad (I)$$

in which Ar denotes naphthalene, X denotes —CH$_2$—CH$_2$— and/or —CH$_2$—CH(CH$_3$)—, Y denotes identical or different radicals of the formulae —CH$_2$—CH$_2$—, —CH$_2$—CH(CH$_3$)— and —CH$_2$—CHOH—CH$_2$—, Z denotes identical or different radicals of the formulae —OH, —O—CO—CH=CH—COOM, —O—CO—CH$_2$—CH(SO$_3$M)—COOM,

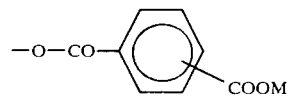

and —SO$_3$M, in which M represents a cation, with the proviso that at least one radical Z is different from OH, R$^1$, R$^2$ and R$^3$ denote hydrogen or alkyl having 1 to 14 C atoms, R denotes hydrogen or alkyl having 1 to 9 C atoms, m denotes a number from 1 to 150 and n denotes a number from 1 to 9.

2. A compound as claimed in claim 1, in which X denotes —CH$_2$—CH$_2$—, Y denotes —CH$_2$—CH$_2$— or —CH$_2$—CHOH—CH$_2$—, Z denotes —O—CO—CH$_2$—CH(SO$_3$M)—COOM,

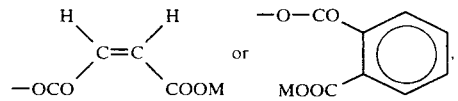

R$^1$ denotes hydrogen or alkyl having 1 to 12 C atoms, R$^2$ and R$^3$ denote hydrogen, R denotes hydrogen or alkyl having 1 to 4 C atoms, m denotes a number from 2 to 25, n denotes a number from 2 to 6 and M denotes hydrogen, an alkali metal, one equivalent of an alkaline earth metal, or an ammonium group which can be substituted by lower alkyl, or an ammonium group obtained from ammonia or such lower alkylamines by addition of up to 100 ethylene oxide and/or propylene oxide units.

3. A compound as claimed in claim 2, in which Z denotes —O—CO—CH$_2$—CH(SO$_3$Na)—COONa, R$^1$ denotes methyl or alkyl having 6 to 12 C atoms, R denotes hydrogen and m denotes a number from 8 to 20.

4. The compound as claimed in claim 3, wherein R$^1$ is nonyl, Y is —CH$_2$—CH$_2$—, m is 19 and n is 4.

5. The compound as claimed in claim 2, wherein Y is —CH$_2$—CH$_2$—, Z is —O—CO—CH=CH—COONa, R$^1$ is nonyl, R is hydrogen, m is 19 and n is 4.

6. A process for reducing the surface tension of an aqueous system which comprises adding to said system an effective amount of a compound as claimed in claim 1.

7. The process as claimed in claim 6, wherein the aqueous system is the coupling medium for preparing azo pigments.

8. The process as claimed in claim 6, wherein the aqueous system is a dye dispersion.

9. The process as claimed in claim 6, wherein the aqueous system is a textile treating liquor.

10. A process for wetting, emulsifying, textile treating or dyeing which comprises adding to the treating liquors an effective amount of a compound as claimed in claim 1.

* * * * *